United States Patent
Davies

(10) Patent No.: US 8,019,054 B2
(45) Date of Patent: Sep. 13, 2011

(54) METHOD AND APPARATUS FOR DYNAMICALLY GENERATING COLOR RINGBACK TONES

(75) Inventor: Martyn W. Davies, Dorking (GB)

(73) Assignee: Dialogic Corporation, Montreal, Quebec (CA)

( * ) Notice: Subject to any disclaimer, the term of this patent is extended or adjusted under 35 U.S.C. 154(b) by 938 days.

(21) Appl. No.: 11/957,764

(22) Filed: Dec. 17, 2007

(65) Prior Publication Data

US 2009/0154664 A1    Jun. 18, 2009

(51) Int. Cl.
*H04M 1/64* (2006.01)
(52) U.S. Cl. .............. 379/88.12; 379/88.14; 379/88.25
(58) Field of Classification Search ............... 379/88.12, 379/88.25
See application file for complete search history.

(56) References Cited

U.S. PATENT DOCUMENTS

| | | | |
|---|---|---|---|
| 7,010,100 B1 * | 3/2006 | Garg et al. | 379/88.12 |
| 7,613,287 B1 * | 11/2009 | Stifelman et al. | 379/215.01 |
| 2007/0121808 A1 * | 5/2007 | Brunson et al. | 379/67.1 |
| 2007/0168462 A1 | 7/2007 | Grossberg et al. | |
| 2007/0189488 A1 * | 8/2007 | Stoops | 379/207.16 |
| 2007/0189497 A1 | 8/2007 | Bareis | |

FOREIGN PATENT DOCUMENTS

| | | |
|---|---|---|
| WO | WO 2005/081509 | 9/2005 |
| WO | WO 2007/070250 | 6/2007 |
| WO | WO 2007/089447 | 8/2007 |

* cited by examiner

*Primary Examiner* — Simon Sing
(74) *Attorney, Agent, or Firm* — Weingarten, Schurgin, Gagnebin & Lebovici LLP

(57) ABSTRACT

A system and method for providing dynamically generated information to a caller during the ringing state of a telephone call. In one example, color ringback tones may be used in conjunction with text-to-speech technology and caller ID services to provide personalized audio messages. These messages may be generated in real time and may include information that may be useful to the caller, such as up-to-date status information (e.g., the status of the caller's voicemail inbox), news or other information.

25 Claims, 4 Drawing Sheets

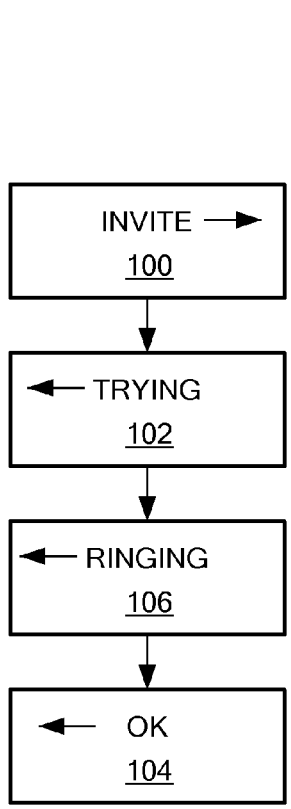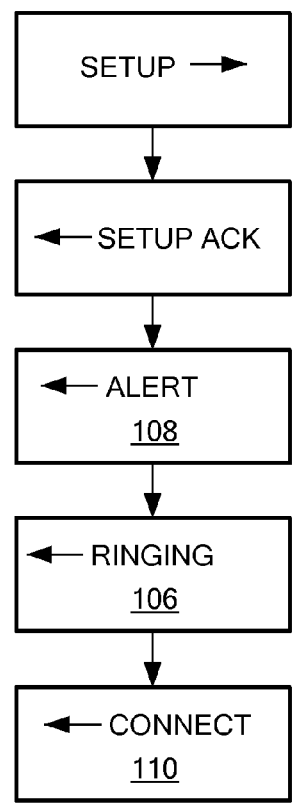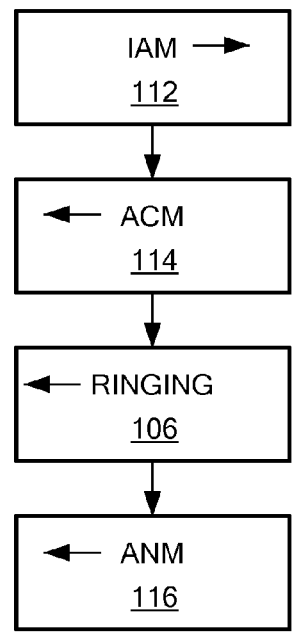
*FIG. 1*  *FIG. 2*  *FIG. 3*

METHOD AND APPARATUS FOR DYNAMICALLY GENERATING COLOR RINGBACK TONES

BACKGROUND

1. Field of Invention

Aspects and embodiments relate generally to telecommunications and, more particularly, to color ringback tone services.

2. Discussion of Related Art

Ringback tones are the audio sounds heard by a calling party while waiting for a connection to a called party to be completed. The most commonly used ringback tone is the familiar "ring ring" sound heard until the call is answered. One example of a system and method for providing audible ringback tones in a telecommunications network is described in PCT patent publication number WO05122542 entitled "METHOD AND SYSTEM FOR PROVIDING RINGBACK TONES" and having an International filing date of Dec. 22, 2005.

At present, color ringback tone (CRBT) is a technology used predominantly in mobile phone networks, and also in some voice over IP (VoIP) systems. Instead of hearing the familiar "ring ring" tone when calling someone, CRBT allows a subscriber (e.g., a mobile phone user) to play their favorite tune, sound or jingle to incoming callers. With the ability to choose the ring tone a caller will hear, subscribers have an instant way to express their own individuality, and to provide a customized response to the calling party. Optionally, the traditional "ring ring" tone can be mixed with the subscriber's chosen music or sound, so as not to confuse callers unfamiliar with the CRBT service.

An attractive feature of CRBT is that this network-based service is independent of both handsets and Subscriber Identity Modules (SIMs). Therefore, users (subscribers or callers) are not required to have the latest phone or a particular brand of phone, and operators have the flexibility to offer personalized ring back services to all types of subscribers. Such personalization services are usually chargeable services. Thus, CRBT provides operators with the ability to easily generate additional revenue from service management, using a wealth of existing subscriber data.

An example of a system and method for implementing color ringback tones is discussed in PCT patent publication number WO06075809 entitled "METHOD AND APPARATUS FOR PROVIDING SOUNDS FOR SUBSTITUTING RINGBACK TONES" and having an International filing date of Jan. 12, 2005.

Speech synthesis is the artificial production of human speech, and can be accomplished by a computer using hardware, software, or a combination of both. A "text to speech" system converts normal language text into speech. The most important qualities of a speech synthesis system are generally considered by those of ordinary skill in the art to be naturalness and intelligibility. Naturalness describes how closely the output sounds like human speech, while intelligibility is the ease with which the output is understood. The ideal speech synthesizer is both natural and intelligible.

There are two primary technologies for generating synthetic speech waveforms, namely concatenative synthesis and formant synthesis. Concatenative synthesis is based on the concatenation (or stringing together) of segments of recorded speech. Generally, concatenative synthesis produces the most natural-sounding synthesized speech; however, differences between natural variations in speech and the nature of the automated techniques for segmenting the waveforms sometimes result in audible glitches in the output. Formant synthesis does not use human speech samples at runtime. Instead, the synthesized speech output is created using an acoustic model. Parameters such as fundamental frequency, voicing, and noise levels are varied over time to create a waveform of artificial speech. Although many systems based on formant synthesis technology generate artificial, robotic-sounding speech, formant-synthesized speech can be reliably intelligible, even at very high speeds, avoiding the acoustic glitches that commonly plague concatenative systems. Both methods are widely used, and the particular goals and needs of a system may influence selection of the method of speech synthesis for that system.

SUMMARY OF INVENTION

At least some aspects and embodiments are directed to the use of color ringback tones, in conjunction with text-to-speech technology, to provide personalized audio messages. Coupling CRBT to text-to-speech technology and to a caller-ID service allows the CRBT message to be not just a "canned" message (i.e., a message selected from a predetermined fixed list of options), but a real-time, dynamically generated audio message that gives the caller some up-to-date news or information from the system being called, as discussed further below.

According to one embodiment, a method of providing information from a called system to a caller before a call to the called system is answered may comprise acts of receiving the information from the called system, converting the information into an audio signal, and playing the audio signal before the call is answered. In one example, playing the audio signal includes playing the audio signal during a ringing state of the call. Playing the audio signal may further include playing the audio signal superimposed on a ringing tone during the ringing state of the call. In another example, converting the information into an audio signal includes converting the information into a spoken message. The method may further comprise extracting caller identification information and providing the caller identification information to the called system. The called system may then tailor the information it provides based on the caller identification information. In one example, the information may be received in the form of a text message, and may be converted to a spoken message using a text-to-speech apparatus. In another example, the spoken message may be superimposed on a ringing tone to make it clear to the caller that the call is still in the ringing state.

According to another embodiment, a system for providing information from a called system to a caller during a ringing state of a telephone call may comprise means for receiving the information from the called system and for generating a text message comprising the information, a text-to-speech apparatus constructed and arranged to convert the text message into a spoken message, and a media gateway constructed and arranged to play the spoken message during the ringing state of the telephone call.

Another embodiment of a system for providing information to a caller during a ringing state of a telephone call may comprise the following elements: a media channel, a media server coupled to the media channel, an application, and a text-to-speech apparatus. The application may be constructed and arranged to provide control information to the media server, which may provide a text message to the text-to-speech apparatus based on the control information. The text-to-speech apparatus may be constructed and arranged to provide an audio signal to the media sever, the audio signal being derived from the text message. This audio signal may comprise a spoken message derived from the text message. In one example, the text-to-speech apparatus may be implemented as a software function within the media server. The media server may further be constructed and arranged to output a media signal on the media channel during the ringing state of the telephone call, the media signal comprising the audio signal.

In one example, the application may be constructed and arranged to communicate with the media server using MSML scripts. In another example, the application may be further constructed and arranged to receive a caller ID that identifies at least one of the caller and a telephone number from which the caller is calling. In this case, the control information may be based at least in part on the caller ID. According to one embodiment, the system may further comprise a called system, and the application may be constructed and arranged to request system information from the called system, and to include at least some of that system information in the control information that it provides to the media server. The called system may be, for example, a voicemail server.

According to one embodiment in which the called system is a voicemail server, the application may be constructed and arranged to provide a caller ID to the voicemail server which may then provide system information that is based at least in part on the caller ID. This system information may include, for example, the status of a mailbox (e.g., how many new voicemail messages are waiting) associated with the caller ID. The status of the mailbox may be passed from the voicemail server to the application, to the media server, and may then be included in text message provided to the text-to-speech apparatus. Accordingly, the audio signal provided by the text-to-speech apparatus may then also include the status of the mailbox associated with the caller ID. In some examples, the wherein the media signal may comprise a ringing tone in addition to the information, to signal to the caller that the call is still in the ringing state. Thus, the system may be used to provide personalized information to a caller during the ringing state of a call, for which the caller may not be charged, as discussed further below.

Another embodiment is directed to a method of providing information from a called system to a caller during a ringing state of a telephone call, the method comprising receiving the information from the called system, converting the information into an audio signal, and playing the audio signal during the ringing state of the telephone call. In one example, the audio signal comprises a spoken message, and converting the information into the audio signal comprises using a text-to-speech apparatus to convert the information into the spoken message.

According to another embodiment, a system for providing information to a caller before a call made by the caller is answered comprises a media channel, media server, coupled to the media channel, and constructed and arranged to receive call signal information and to output a media signal on the media channel before the call is answered, and a text-to-speech apparatus coupled to the media server. The media server is constructed and arranged to provide a text message to the text-to-speech apparatus based on the call signal information, and the text-to-speech apparatus is constructed and arranged to provide an audio signal to the media sever, the audio signal being derived from the text message, wherein the media signal comprises the audio signal.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF DRAWINGS

Various aspects of at least one embodiment are discussed below with reference to the accompanying figures. In the figures, which are not intended to be drawn to scale, each identical or nearly identical component that is illustrated in various figures is represented by a like numeral. For purposes of clarity, not every component may be labeled in every drawing. The figures are provided for the purposes of illustration and explanation and are not intended as a definition of the limits of the invention. In the figures:

FIG. 1 is a flow diagram illustrating an example of a call progress procedure in an SIP telephony system;

FIG. 2 is a flow diagram illustrating one example of a call progress procedure in an ISDN telephony system;

FIG. 3 is a flow diagram illustrating one example of a call progress procedure in an SS7 telephony system;

DETAILED DESCRIPTION

Figure 4:
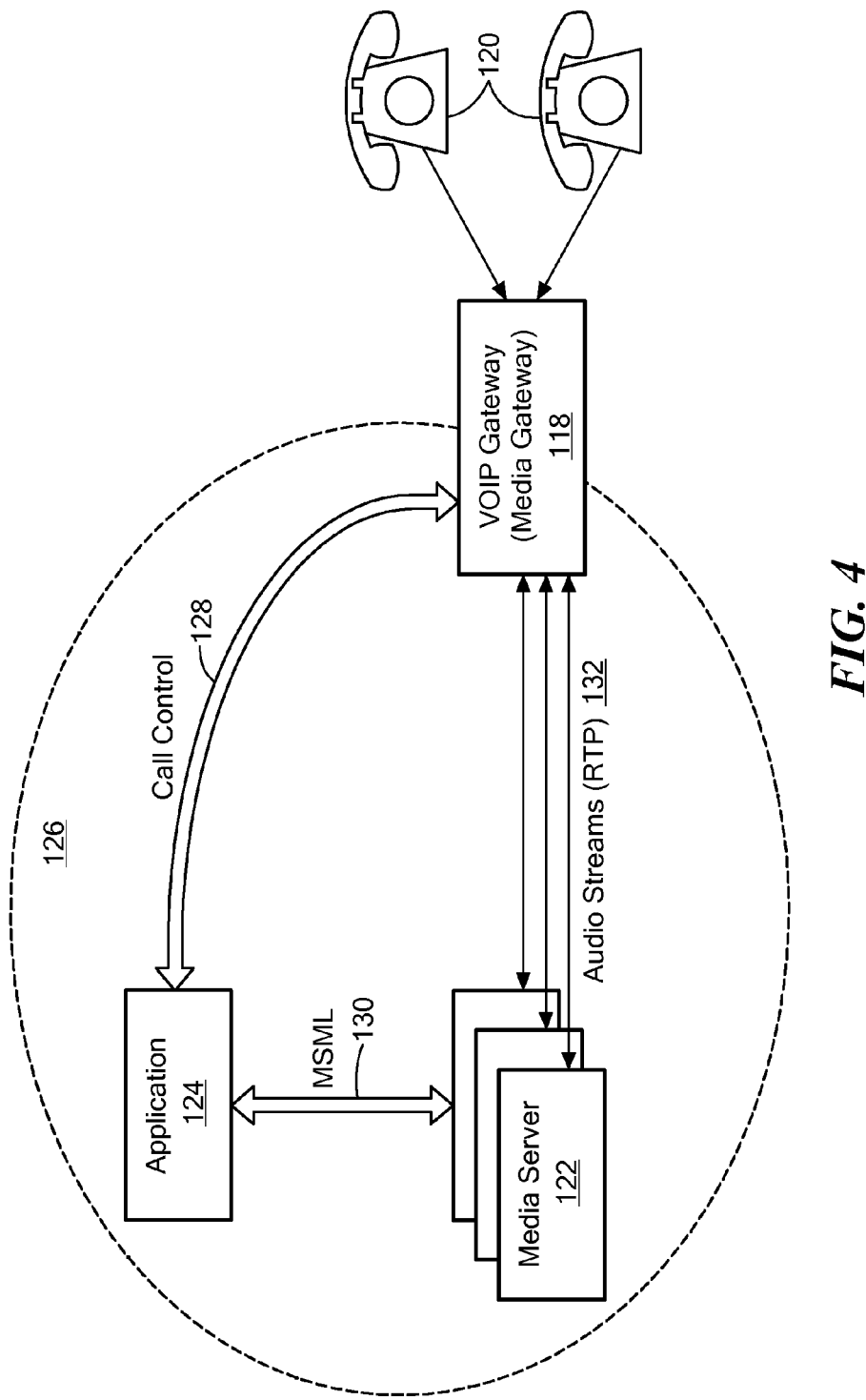
FIG. 4 is a block diagram of one example of a system for dynamically generating color ringback tones.

At least some aspects and embodiments are directed toward methods and apparatuses that combine color ringback tone (CRBT) technology with text-to-speech technology to generate personalized audio messages during the ringing state of a call (i.e., after the call has been dialed or otherwise initiated, but before it is answered). In conventional CRBT systems, the audio (typically one or more pieces of music or other sound effects) played during the ringing state is selected by the called party, usually from a fixed list of available files or tracks. By contrast, according to at least one embodiment, the audio information played during the ringing state may be dynamically and specifically generated using text-to-speech technology, as discussed further below. In some embodiments, caller identification (caller-ID) services may be used to identify the caller and to tailor the audio message to provide information specific to that caller. Thus, according to some embodiments, a method and apparatus may be used to give more useful information than the simple, conventional "ring ring" tone to a specific caller, one example being the status of the caller's voicemail box, as discussed further below.

It is to be appreciated that embodiments of the methods and apparatus discussed herein are not limited in application to the details of construction and the arrangement of components set forth in the following description or illustrated in the accompanying drawings. The methods and apparatus are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other one or more embodiments. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

There are several different wireless and wireline telephony technologies currently in existence and use, for example, e.g., voice over Internet protocol (VoIP), mobile phone networks, land-based phone networks, etc. However, each telephony technology implements a call progress procedure that distinguishes between the state before the call is connected and the state after the call is connected. Specifically, between dialing and answering of a call, there is a "ringing" state during which an audio signal (either the conventional "ring ring" tone or, where a CRBT service is in use, a personalized sound either alone or in combination with the so-called "ring ring" tone) is heard by the person placing the call. It is to be appreciated that the term "ringing state" as used herein is intended to refer to the call state between successful dialing, or initiation, of a call and when the call is answered, regardless of whether or not any ringing tone or other sound is played during that state.

For example, referring to FIG. 1, there is illustrated a flow diagram of the call progress mechanism for networks (such as VoIP networks or IP multimedia system (IMS) networks) using the session initiation protocol (SIP). The call is initiated (block 100), then the system attempts to dial the called party (block 102). The call is completed when the called party (or their answering service) picks up (block 104). Between "trying" (block 102) and "OK" (block 104) is the ringing state (block 106) in which the caller would hear the "ring ring" tone, signaling that the call is correctly dialed, but has not yet been answered.

Similarly, referring to FIG. 2, in an ISDN system, between the "alert" (block 108) and "connect" (block 110) messages, is the ringing state 106. Referring to FIG. 3, with a common channel signaling (SS7) system, the initial address message (block 112) is answered by an "address complete" message (block 114). From that point, the phone is ringing (state 106) until it is answered and the answer message is received (block 116). Thus, although there are several different telephony technologies that can used for the call legs, each call has a measurable "call progress" state.

According to one embodiment, this call progress state may be detected by a media server (or an application controlling the media server), which may control or coordinate providing a real-time, dynamically generated audio message to a caller during the ringing state of the call. The media server may be any type of media server generally used in the telecommunications industry. Some examples of media servers include, but are not limited to, IP media server boards, host media processing boards and software, multimedia platforms and media gateways, including but not limited to DM/V boards, host media processing software, multimedia platform (MMP) and IP Media Server, all of which are currently commercially available from Dialogic Corporation or its subsidiaries.

According to at least one embodiment, software may be loaded onto the media server, or may be loaded onto a system in communication with the media server, to instruct the media server to provide a personalized CRBT service. In one example, this personalized CRBT service may be a chargeable service, and the software (referred to herein as an "application") may instruct the media server to determine whether the caller is a subscriber to the service, and to provide the service only to recognized subscribers. It is to be appreciated that alternate methods of charging for the service, apart from a subscription, may also be used, and the application may be programmed to account for whichever charging method(s) are implemented in a given system.

Referring to FIG. 4, there is illustrated an example of a system according to one embodiment. The system may comprise a media gateway 118 (such as, for example, a VoIP gateway), a media server 122, and an application 124, all forming part of a public switched telephone network 126. As discussed above, the application 124 may be loaded onto the media server 122 or may be part of an apparatus in communication with the media server 122. In one example, the application 124 may communicate with the media server software using Media Server Markup Language (MSML), as indicated by arrow 130. The media gateway 118 may communicate with one or more telephone subscribers 120.

According to one embodiment, a telephone subscriber 120 may initiate a call, and the call may be received by the media gateway 118. The media gateway 118 may provide call control information 128 to the application 124 which, in turn, communicates with the media server 122 to instruct the media server to generate an audio message to be provided to the telephone subscriber 120 during the ringing state of the call. The call control information may generally comprise call signaling information, alerting the media server to the presence of an incoming call and optionally providing caller ID information. The media server 122 may convert a text message into a stream of spoken speech in a language chosen by the person who configured the media server 122. This may be accomplished using one of the speech synthesis methods discussed above. An audio signal comprising the stream of speech may be provided to the media gateway 118, as indicated by arrows 132, which passes it on to the telephone subscriber 120. The text message may be received at the media server 122 from a server or system in communication with the media server 122, one example being a voicemail server. The text message may contain some information, news, or status of the system supplying the text message.

Thus, when a telephone subscriber 120 calls in to the media server 122, instead of (or in addition to) hearing the familiar "ring ring" tone, the subscriber hears a computer-speech generated message giving some system news or status. Because the information is supplied during the ringing state of the call, the call need not connect, in which case there may be no charge for the call from the telephone operator. In at least one embodiment, the media server may receive caller ID information (which may be contained in the call control information supplied to the application 124 by the media gateway 118) and may further refine or personalize the information based on the identity of the subscriber.

Figure 5:
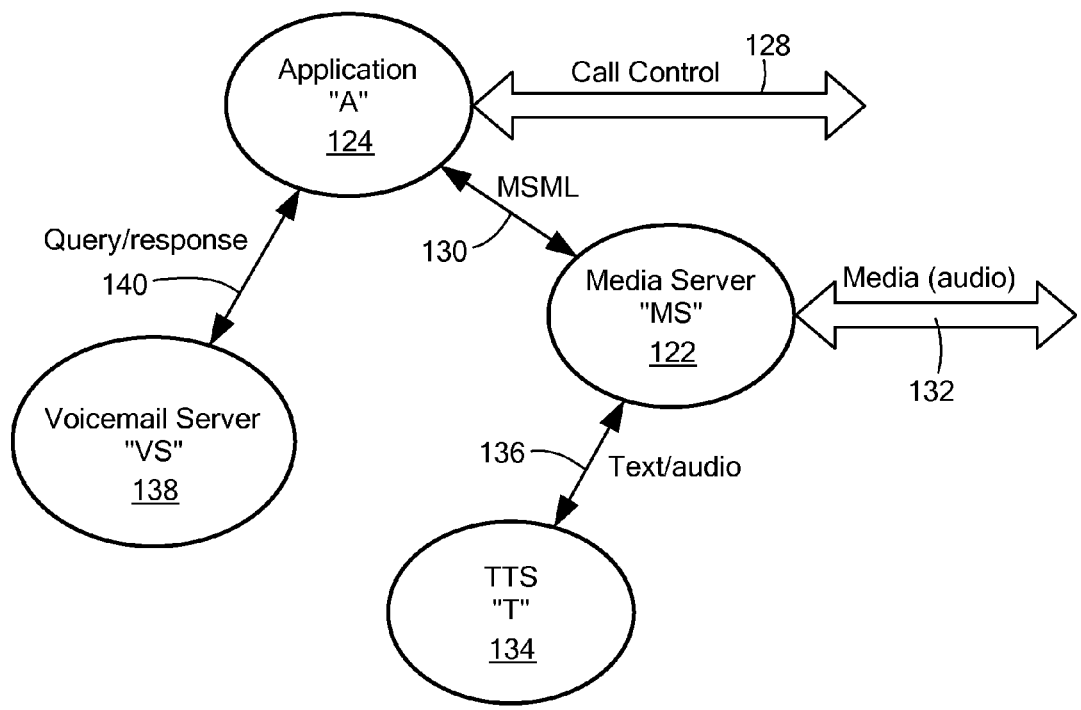
FIG. 5 is a block diagram of another example of a system for dynamically generating color ringback tones.
Figure 6:
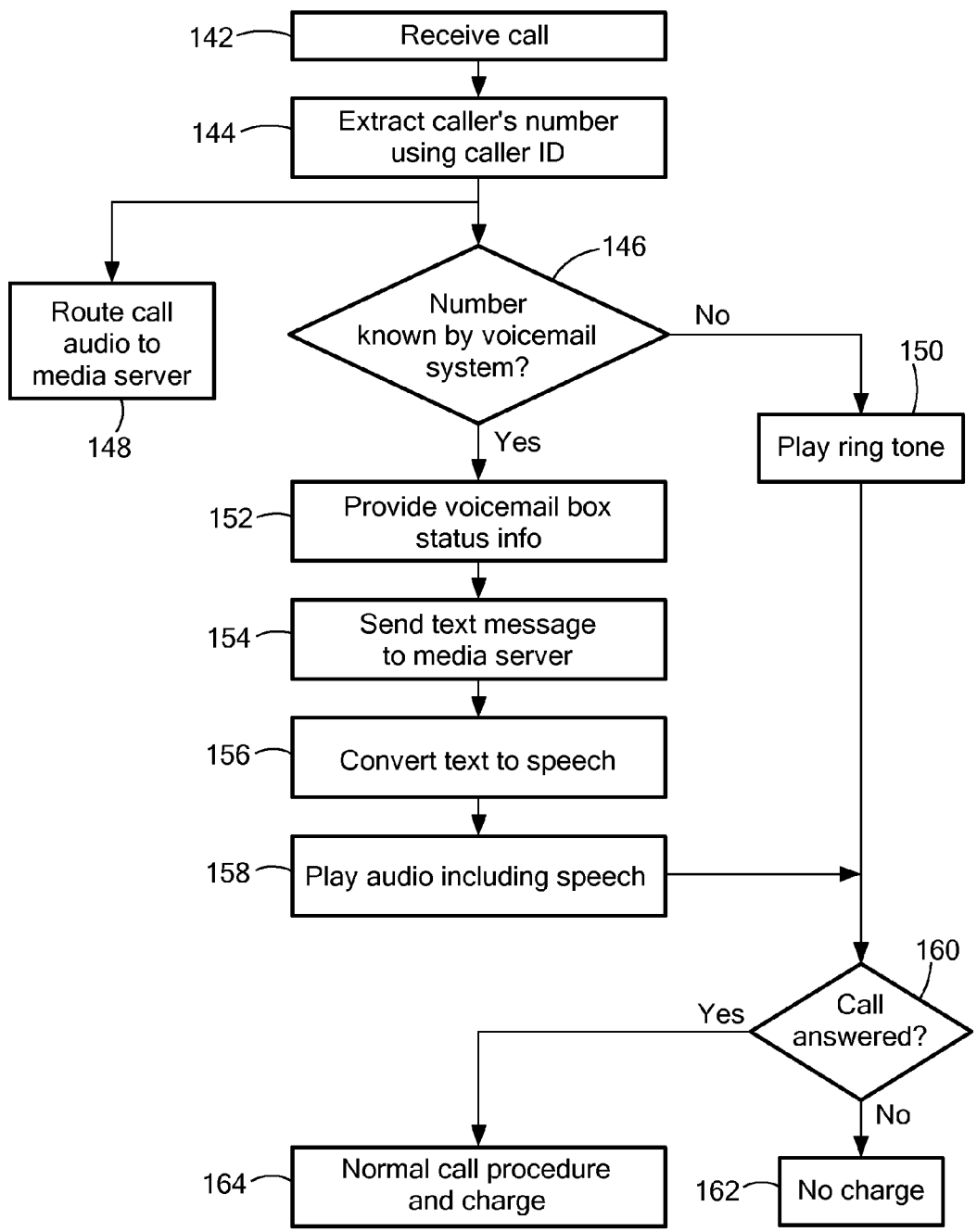
FIG. 6 is a flow diagram illustrating one example of a method of dynamically generating color ringback tones.

The above discussed system(s) and method(s) may be adapted to a variety of applications to allow a telephone subscriber to retrieve information during the ringing state of the call, and thus, at no charge. One such application includes allowing a subscriber to retrieve the status of their voicemail box without incurring a toll, connection and/or other call-related charge or fee. An example of a system and method that may be used for this application is discussed below with reference to FIGS. 5 and 6. FIG. 5 is a block diagram of one example of the system, and FIG. 6 is a flow diagram illustrating one example of a method of operating the system. Although this example is specific to allowing a subscriber to retrieve voicemail, it is to be appreciated that the invention is not so limited and the principles of the system(s) and method (s) may be applied to a wide variety of other applications in which it may be useful to supply a caller with dynamically varying information. For example, color ringback messages may be used to provide a caller with information such as an expected wait time on a customer service line, operating hours of a business, advertising information of other news.

Referring to FIGS. 5 and 6, in a first step 142, the application 124 may receive a call indication via the call control information 128. The call indication alerts the application 124 to an incoming call from a telephone subscriber. In one example, the telephone subscriber may initiate this process by calling in to a specific direct-dial number to retrieve information from their voicemail system. This may be run, for example, by a telephone operator such as a CLEC (Competitive Local Exchange Carrier) or ILEC (Incumbent Local Exchange Carrier) or an enterprise system. The application 124 may extract the caller's number using a caller ID service (step 144). It is to be appreciated that the caller ID service may be part of the application 124, or may be implemented by the media gateway 118 (see FIG. 4) and provided to the application in the call control information 128. In step 146, the application 124 may send a query (as indicated by arrow 140) to a voicemail server 138 to ask the voicemail server 138 if the caller's number is a recognized number (i.e., is the caller an owner of a voicemail box on the system).

The application 124 may also route the audio from the call to the media server 122 (step 148). If the caller's number is not known by the voicemail server 138, the application 124 may instruct the media server to play the conventional "ring ring" tone (or a similar sound) through the media channel 132 (step 150). The call may remain in the ringing state until the subscriber hangs up or the call is answered by the voicemail system, as discussed further below.

As discussed above, in at least one embodiment, instructions may be sent from the application 124 to the media server 122 (and vice versa) in the form of MSML scripts. However, in other embodiments, for example, in an enterprise implementation, there may be a single server that receives both signaling and audio. In the case of a single server, the application 124 and the media server 122 may be co-located and may use communication systems other that the delivery of MSML scripts.

Still referring to FIGS. 5 and 6, if the voicemail server 138 recognizes the caller's number, the voicemail server 138 may return information (as indicated by arrow 140) to the application 124, the information indicating a status of the caller's voicemail box (step 152). For example, the information may include the number of new and/or saved voicemail messages the caller has, the time at which the messages were received, and/or the number(s) from which the person(s) who left the message(s) called, etc. In one example, where the voicemail system has a caller-ID service, the voicemail server 138 may extract the names of callers who left messages and supply the names to the application 124. The application 124 may use the information received from the voicemail server 138 to construct an MSML script to be sent to the media server 122 (step 154) to describe the color ringback tone that should be generated by the media server. In one embodiment, the MSML script may contain a text message that indicates the status of the caller's voicemail box, such as, for example, "you have four new messages."

According to one embodiment, the media server may be coupled to a text-to-speech apparatus 134. The text-to-speech apparatus 134 may be co-located in the same server as the media server 122, or may be part of a system that is in communication with the media server 122. In one example, the text-to-speech apparatus 134 may be implemented as a software function within the media server 122. In step 156, the media server 122 may use the text-to-speech apparatus 134 to render the text message into audio, i.e., spoken English, Spanish or whatever language the system has been programmed to speak. Thus, as indicated by arrow 136, the media server 122 may provide a text message to the text-to-speech apparatus 134, and receive a corresponding audio signal from the text-to-speech apparatus 134. In one example, the language choice may be made by the media server 122 from a look-up table (in the media server's configuration) of the caller's ID. In another example, the language choice may be static, i.e., may be one a preprogrammed choice (e.g., English) that will be used regardless of the caller ID information. The media server 122 then plays out the audio on the media channel 132 (step 158) so that it may be heard by the caller. In one embodiment, the speech may be superimposed on top of the familiar "ring ring" tone so that it is clear to the caller that the call is still in the ringing state. The spoken message may be repeated as necessary to fill the available time before the call connects.

After the caller has heard the audio message, the caller may choose (step 160) to remain on the line (for example, if the message indicates that there are new voicemail messages to be retrieved), or may decide to hang up and end the call (e.g., if the message the caller hears informs him/her that there are no new voicemail messages). If the caller remains on the line, the call will be answered by the voicemail system. At that time, call audio may be disconnected from the media server 122 and the application 124 may drop out of the loop. The call may then be handled through the normal voicemail system procedure (step 164). Generally, the voicemail server may connect the call after a predetermined number of rings, or after a predetermined time period has elapsed (e.g., 15 or 30 seconds). In one example, the media server may be configured to hold the call in the ringing state for a predetermined time period so as to give the caller sufficient time to hear the color ringback message. The voicemail server picking up the call may signal the beginning of billing operations for the call (e.g., pay-per-minute calling, etc.) as the call is now connected.

Alternatively, if the caller hangs up after hearing the message, but while the call is still in the ringing state, there may be no charge for the call (step 162). The system and method may therefore, provide the caller with the option of only waiting on the line for the call to the voicemail server to connect if the caller knows (from the color ringback message they have heard) that there are new voicemail messages in the voicemail inbox. Thus, by combining CRBT technology with text-to-speech technology and caller ID services, systems and methods may be implemented that offer enhanced service to telephone subscribers by providing unique, personalized and real-time audio messages (color ringback messages) to individual callers. Furthermore, because these messages are provided during the ringing state of the call, the caller may receive the information without being charged for a call connection.

Having thus described several aspects of at least one embodiment, it is to be appreciated various alterations, modifications, and improvements will readily occur to those skilled in the art. For example, systems and methods may be implemented to provide a caller with status information for systems other than voicemail systems. The color ringback messages may be used to provide a variety of information, such as, for example, operating hours or store locations of businesses, specific advertising, or other news or information. The information provided may depend on the media server configuration, which may, in turn, depend on the particular direct-dial number the caller has called. Such and other alterations, modifications, and improvements are intended to be part of this disclosure and are intended to be within the scope of the invention. Accordingly, the foregoing description and drawings are by way of example only and the scope of the invention should be determined from proper construction of the appended claims, and their equivalents.

What is claimed is:

1. A method of providing information to a caller during a ringing state of a caller-initiated telephone call to a called system, the method comprising:
   receiving information from the called system regarding a status of a voice-mail mailbox associated with the caller;
   converting the received information regarding the status of the voice-mail mailbox into an audio signal; and
   playing the audio signal to the caller during the ringing state of the call,
   wherein converting the information into an audio signal includes converting the information into a spoken message.

2. The method as claimed in claim 1, wherein playing the audio signal includes playing the audio signal superimposed on a ringing tone during the ringing state of the call.

3. The method as claimed in claim 1, further comprising:
   extracting caller identification information; and
   providing the caller identification information to the called system.

4. The method as claimed in claim 1, wherein converting the information includes using a text-to-speech apparatus to convert a text message into a spoken message; and wherein the audio signal comprises the spoken message.

5. A computer readable medium having computer-readable signals stored thereon that define instructions that, as a result of being executed by a processor, instruct an apparatus comprising the processor to perform the method of claim 1.

6. The method as claimed in claim 1, further comprising:
   holding the call in the ringing state long enough for the entire audio signal to be played.

7. A system for providing information to a caller during a ringing state of a caller-initiated telephone call to a called system, the system comprising:
   a media channel;
   a media server, coupled to the media channel, and constructed and arranged to output a media signal to the caller on the media channel during the ringing state of the telephone call;
   an application executable in the media server and constructed and arranged to provide control information to the media server; and
   a text-to-speech apparatus coupled to the media server,
   wherein the media server is constructed and arranged to provide a text message to the text-to-speech apparatus based on the control information received from the application, and
   wherein the text-to-speech apparatus is constructed and arranged to provide an audio signal to the media server, the audio signal being derived from the text message,
   wherein the media signal comprises the audio signal,
   wherein the application is further constructed and arranged to receive caller ID information that identifies at least one of the caller and a telephone number from which the caller is calling,
   wherein the application is further constructed and arranged to request system information from the called system, and wherein the control information includes at least some of the system information,
   wherein the application is further constructed and arranged to provide the caller ID information to the called system, and wherein the system information is based at least in part on the caller ID information, and
   wherein the system information comprises a status of a voice-mail mailbox associated with the caller ID information.

8. The system as claimed in claim 7, wherein the application is constructed and arranged to communicate with the media server using at least one Media Server Markup Language (MSML) script.

9. The system as claimed in claim 7, wherein the control information is based at least in part on the caller ID information.

10. The system as claimed in claim 7, wherein the called system is a voicemail server.

11. The system as claimed in claim 7, wherein the text message includes the status of the mailbox associated with the caller ID information.

12. The system as claimed in claim 11, wherein the audio signal includes the status of the mailbox associated with the caller ID information.

13. The system as claimed in claim 7, wherein the text-to-speech apparatus is implemented as a software function within the media server.

14. The system as claimed in claim 7, wherein the media signal further comprises a ringing tone.

15. The system as claimed in claim 7, wherein the status of the voice-mail mailbox comprises at least one of:
   a number indicating an amount of new voicemail messages;
   a time at which a corresponding new voicemail message was received;
   a phone number from which a corresponding new voice-mail message was received; and
   a number indicating an amount of saved voicemail messages.

16. The system as claimed in claim 7, wherein the media server is further constructed and arranged to hold the call in the ringing state long enough for the entire media signal to be played.

17. A system for providing information to a caller before a call, having corresponding caller ID information, made by the caller to a called system is answered, the information providing system comprising:
   a media channel;
   a media server, coupled to the media channel, and constructed and arranged to receive call signal information from the called system based on the caller ID information, the call signal information comprising a status of a voice-mail mailbox associated with the caller ID information, and to output a media signal to the caller on the media channel before the call is answered; and
   a text-to-speech apparatus coupled to the media server,
   wherein the media server is constructed and arranged to provide a text message to the text-to-speech apparatus based on the received call signal information,
   wherein the text-to-speech apparatus is constructed and arranged to provide an audio signal to the media server, the audio signal being derived from the text message, and
   wherein the media signal comprises the audio signal.

18. A system for providing information to a caller of a called system during a ringing state of a caller-initiated telephone call, the information providing system comprising:
   a media channel; and
   a media server, coupled to the media channel, constructed and arranged to:
   request, from the called system, a status of a voice-mail mailbox associated with the caller;

prepare a media signal based on the status of the voice-mail mailbox;

output the media signal to the caller on the media channel during the ringing state of the telephone call; and output a text message comprising the voice-mail mailbox status; and a text-to-speech apparatus coupled to the media server to receive the text message and to provide an audio signal to the media server derived from the text message, wherein the media server is constructed and arranged to incorporate the audio signal into the media signal.

19. The information providing system as claimed in claim 18, wherein the media server is further constructed and arranged to:

receive caller ID information that identifies at least one of the caller and a telephone number from which the caller is calling; and request, from the called system, the status of the voice-mail mailbox associated with the caller based on the received caller ID information.

20. The information providing system as claimed in claim 18, wherein the media server is further constructed and arranged to hold the call in the ringing state long enough for the entire media signal to be played.

21. A method of providing information to a caller during a ringing state of a caller-initiated telephone call to a called system, the method comprising:

receiving information from the called system regarding a status of a voice-mail mailbox associated with the caller;

converting the received information regarding the status of the voice-mail mailbox into an audio signal; and playing the audio signal to the caller during the ringing state of the call, wherein converting the received information includes using a text-to-speech apparatus to convert a text message into a spoken message, and wherein the audio signal comprises the spoken message.

22. The method as claimed in claim 21, wherein playing the audio signal includes playing the audio signal superimposed on a ringing tone during the ringing state of the call.

23. The method as claimed in claim 21, further comprising:

extracting caller identification information; and providing the caller identification information to the called system.

24. A computer readable medium having computer-readable signals stored thereon that define instructions that, as a result of being executed by a processor, instruct an apparatus comprising the processor to perform the method of claim 21.

25. The method as claimed in claim 21, further comprising:

holding the call in the ringing state long enough for the entire audio signal to be played.

* * * * *